United States Patent
Matsuda et al.

(10) Patent No.: US 7,487,995 B2
(45) Date of Patent: Feb. 10, 2009

(54) GAS GENERATOR FOR AIR BAG

(75) Inventors: Naoki Matsuda, Tatsuno (JP); Mikio Yabuta, Tatsuno (JP)

(73) Assignee: Daicel Chemical Industries, Ltd., Osaka (JP)

( * ) Notice: Subject to any disclaimer, the term of this patent is extended or adjusted under 35 U.S.C. 154(b) by 247 days.

(21) Appl. No.: 11/370,867

(22) Filed: Mar. 9, 2006

(65) Prior Publication Data

US 2006/0214403 A1 Sep. 28, 2006

Related U.S. Application Data

(60) Provisional application No. 60/661,944, filed on Mar. 16, 2005.

(30) Foreign Application Priority Data

Mar. 10, 2005 (JP) .............................. 2005-067383

(51) Int. Cl.
B60R 21/26 (2006.01)
(52) U.S. Cl. ....................... 280/736; 280/741
(58) Field of Classification Search ................ 280/736, 280/737, 741, 742; 102/530, 531
See application file for complete search history.

(56) References Cited

U.S. PATENT DOCUMENTS 5,992,881 A * 11/1999 Faigle ........................ 280/737
6,142,515 A * 11/2000 Mika .......................... 280/736
6,189,927 B1 2/2001 Mossi et al.
6,315,322 B1 * 11/2001 Mika .......................... 280/736
6,474,684 B1 * 11/2002 Ludwig et al. .............. 280/741
6,543,805 B2 4/2003 McFarland et al.
6,666,476 B2 * 12/2003 Rink et al. ................... 280/741
6,997,477 B2 * 2/2006 Quioc ......................... 280/741
2003/0070574 A1* 4/2003 Rink et al. .................. 102/530
2003/0146611 A1* 8/2003 Kenney et al. .............. 280/736
2005/0052006 A1* 3/2005 Nishimura et al. .......... 280/736

FOREIGN PATENT DOCUMENTS

| DE | 19725418 A1 | 12/1998 |
| DE | 19725452 A1 | 12/1998 |
| JP | 2001-199303 A | 7/2001 |
| JP | 2002-503584 A | 2/2002 |

* cited by examiner

Primary Examiner—John Q. Nguyen
Assistant Examiner—Robert A. Coker
(74) Attorney, Agent, or Firm—Birch, Stewart, Kolasch & Birch, LLP

(57) ABSTRACT

A gas generator for an air bag includes a housing having a gas discharge port, a first combustion chamber and a second combustion chamber, each of the combustion chambers being provided with a gas generating agent and an ignition device, being in the housing, the second combustion chamber being separated from the first combustion chamber by a cup member disposed within the housing, the second gas generating agent and the second ignition device being disposed within the cup member, the cup member being moved upon activation of the second ignition device, thereby forming a discharge passage for a gas generated in the second combustion chamber.

4 Claims, 1 Drawing Sheet

GAS GENERATOR FOR AIR BAG

This nonprovisional application claims priority under 35 U.S.C. § 119(a) on patent application No. 2005-67383 filed in Japan on 10 Mar. 2005 and 35 U.S.C. § 119(c) on U.S. Provisional Application No. 60/661,944 filed on 16 Mar. 2005, which are incorporated by reference.

BACKGROUND OF THE INVENTION

1. Field of the Invention

The present invention relates to a gas generator for an air bag that can be used in a passenger restraining apparatus in an automobile.

2. Description of the Related Art

Automobile makers have made demands for reductions in size and weight of a gas generator for an air bag which is used in a passenger restraining apparatus in an automobile. An effective method of responding to these demands for reduced size and weight is to reduce the number of components in the air bag gas generator by simplifying the structure thereof while maintaining required performance and quality levels.

FIG. 1 of U.S. Pat. No. 6,189,927-B1 (JP-A No. 2002-503584) shows an air bag inflator in which a second chamber 82 is housed within a first chamber 34. A gas outlet orifice 104 of the second chamber 82 is covered by an insulation barrier material 106 which is opened or ruptured when a predetermined pressure is applied thereto from the interior of the second chamber 82.

FIG. 1 of U.S. Pat. No. 6,543,805-B2 shows an inflator 10 including a first combustion chamber 200 and a second combustion chamber 180 which are separated by a fixed partition wall. An igniter cap 220 inside the first combustion chamber 200 slides axially when pushed by the combustion products of an ignition agent 222.

FIG. 1 of JP-A No. 2001-199303 shows a gas generator for an air bag including two combustion chambers 5a, 5b.

SUMMARY OF THE INVENTION

The present invention relates to a gas generator for an air bag comprising:
a housing having a gas discharge port;
a first combustion chamber; and
a second combustion chamber,
each of the combustion chambers being provided with a gas generating agent and an ignition device, being provided in the housing,
the second combustion chamber being separated from the first combustion chamber by a cup member disposed within the housing,
the second gas generating agent and the second ignition device being disposed within the cup member,
the cup member being moved upon activation of the second ignition device, thereby forming a discharge passage for a gas generated in the second combustion chamber.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
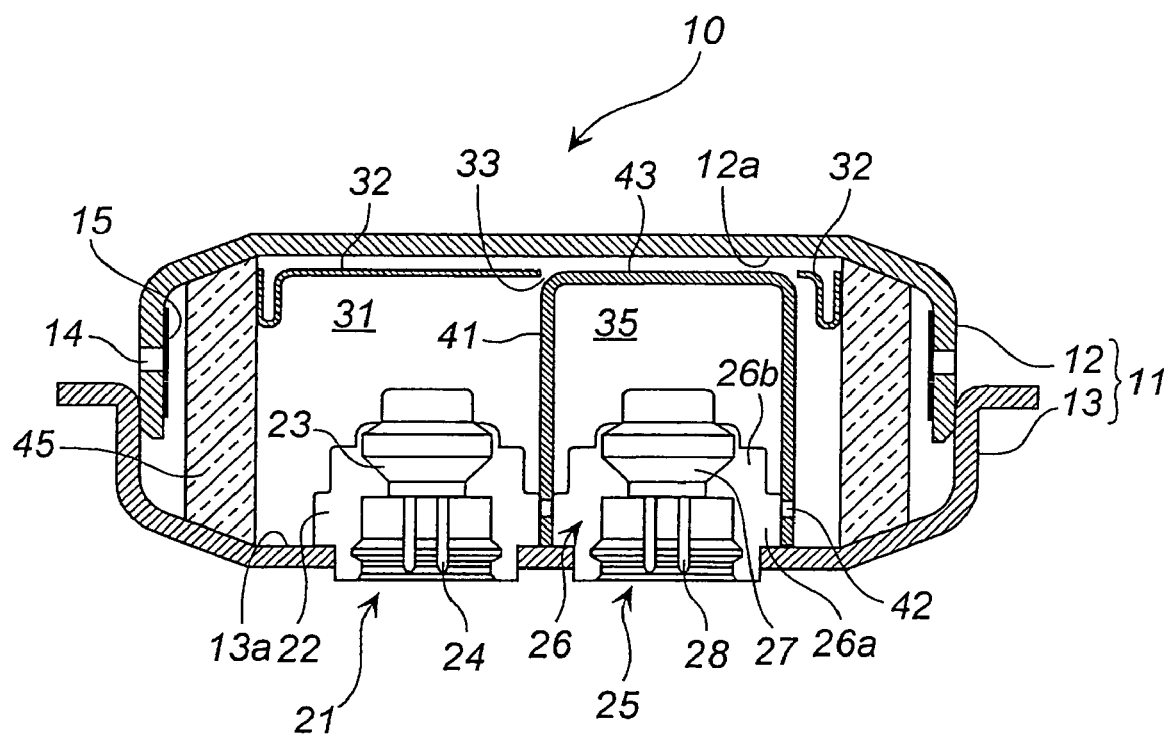
FIG. 1 shows an axial sectional view of a gas generator.

The inflators in U.S.-B2No. 6,543,805and JP-A No. 2001-199303 have complicated structures, and therefore cannot respond sufficiently to demands for reduced weight. The inflator in U.S. -B1No. 6,189,927(JP-A No. 2002-503584) has a simpler structure than the inflators in U.S. -B2No. 6,543,805and JP-A No. 2001-199303, but the second combustion chamber is separated from the first combustion chamber by a fixing member and an insulating member.

The present invention relates to a gas generator for an air bag in which an overall reduction in weight can be achieved through structural simplification while maintaining favorable fine performance and quality levels, and in which the manufacturing process can also be simplified.

The first combustion chamber and second combustion chamber are separated by the cup member forming the second combustion chamber, and since the second combustion chamber is capable of movement, the need for an operation to fix the second combustion chamber and members required to perform such a fixing operation can be eliminated.

The cup member separates the first combustion chamber from the second combustion chamber, and therefore functions to prevent the second gas generating agent in the second combustion chamber from being ignited and burned by the combustion products generated upon combustion of the gas generating agent (first gas generating agent) in the first combustion chamber. Note that this ignition prevention function may be enhanced by adjusting the material or thickness of the cup member within a range enabling weight reduction of the gas generator, or by disposing an incombustible adiabatic member around the cup member.

The present invention also relates to the gas generator for an air bag, wherein the cup member is press-fitted into the housing, and has a closed through-hole in a lower end portion thereof, and when the cup member is moved upon activation of the second ignition device, the through-hole opens, thereby forming the discharge passage for the gas generated in the second combustion chamber.

By providing a through-hole in the cup member in this manner, a gas discharge passage is formed easily when the second ignition device is activated.

The present invention relates to the gas generator for an air bag, wherein the second ignition device is a combination of a second igniter and a second igniter collar, and by fitting an opening portion of the cup member onto the second igniter collar, the cup member is fixed into position such that the through-hole in the cup member is closed.

When the second igniter collar is used in this manner, the cup member can be positioned and the through-hole can be closed prior to activation of the second ignition device. In the present invention, the cup member moves upon activation of the second ignition device, and hence there is no need to fix the cup member to the housing and so on.

The present invention also relates to the gas generator for an air bag, wherein a peripheral edge of an opening portion of the cup member contacts a bottom face of the housing and a gap exists between a ceiling surface of the cup member and a ceiling surface of the housing such that when the second ignition device is activated, the ceiling surface of the cup member rises so as to impinge on the ceiling surface of the housing, thereby forming the discharge passage for the gas generated in the second combustion chamber.

By limiting the movement of the cup member, gas discharge action of the gas generator is not obstructed by movement of the cup member.

The present invention also relates to the gas generator for an air bag, wherein the second combustion chamber is located within the first combustion chamber, a first ignition device including a combination of a first igniter and a first igniter collar is disposed within the first combustion chamber, and a part of a peripheral surface of the cup member is sandwiched between the first igniter collar and the second igniter collar.

By sandwiching the cup member in this manner, the action to prevent the cup member from moving prior to activation can be enhanced.

The gas generator for an air bag of the present invention has a simplified structure, and therefore the manufacturing process can also be simplified and a reduction in the overall weight thereof can be achieved.

Embodiments of the Invention

An embodiment of the present invention will now be described using FIG. 1. FIG. 1 shows an axial sectional view of a gas generator for an air bag.

An outer shell of an air bag gas generator 10 is formed from a housing 11 in which a diffuser shell 12 and a closure shell 13 are joined integrally. The diffuser shell 12 and closure shell 13 are welded at a joint portion.

A plurality of gas discharge ports 14 are provided in the peripheral surface of the diffuser shell 12, and the gas discharge ports 14 are sealed from the inside by a sealing tape 15 made of aluminum or stainless steel.

Two holes are provided in the bottom face of the closure shell 13, and a first ignition device 21 and a second ignition device 25 are fitted respectively into the holes such that moisture from the outside atmosphere can be prevented from entering.

The first ignition device 21 has a first igniter 23 fixed to a first igniter collar 22. A connector having a lead wire is fitted onto two conductive pins 24 extending from the first igniter 23, and the connector is connected to a battery.

The second ignition device 25 has a second igniter 27 fixed to a second igniter collar 26. A connector having a lead wire is fitted onto two conductive pins 28 extending from the second igniter 27, and the connector is connected to a battery. The second igniter collar 26 comprises a larger diameter portion 26a and a smaller diameter portion 26b.

A first combustion chamber 31 and a second combustion chamber 35 are provided in the housing 11, and the second combustion chamber 35 is separated from the first combustion chamber 31 by a cup member 41. In FIG. 1, the second combustion chamber 35 is housed within the first combustion chamber 31, but the first combustion chamber 31 and second combustion chamber 35 may be disposed adjacent to each other. A first gas generating agent, not shown in the drawing, is charged into the first combustion chamber 31, and a second gas generating agent, not shown in the drawing, is charged into the second combustion chamber 35.

The cup member 41 forming the second combustion chamber 35 is press-fitted onto the larger diameter portion 26a of the second igniter collar 26, the outer diameter of which is greater than the inner diameter of the cup member 41. By press-fitting the cup member 41 onto the larger diameter portion 26a in this manner, the cup member 41 is fixed into position and the cup member is prevented from moving axially or radially.

Furthermore, a part of the peripheral surface of the cup member 41 is sandwiched between the second igniter collar 26 and the first igniter collar 21, and therefore the cup member 41 is unlikely to move axially or radially prior to an activation. If necessary, all or a part of the peripheral edge of the opening portion of the cup member 41 may be fixed to the first igniter collar 26 by caulking.

The peripheral edge of the opening portion of the cup member 41 contacts a bottom face 13a of the closure shell 13, while a gap exists between a ceiling surface 43 of the cup member 41 and a ceiling surface 12a of the diffuser shell 12.

A plurality of through-holes 42 are formed in the peripheral surface of the cup member 41 near the opening portion. The plurality of through holes 42 contact the peripheral surface of the larger diameter portion 26a of the second igniter collar 26, and are therefore closed.

A retainer 32 is fitted into the first combustion chamber 31 for adjusting the volume of the first combustion chamber 31 in accordance with the charged amount of the first gas generating agent. The retainer 32 has a hole 33 in the part thereof directly opposing the ceiling surface 43 of the cup member 41. The diameter of the hole 33 is set to be considerably larger than the outer diameter of the cup member 41.

A cylindrical coolant/filter 45, which has functions for filtering and cooling combustion gas, is disposed on the outside of the first combustion chamber 31, and a gap is provided between the outer peripheral surface of the coolant/filter 45 and the gas discharge ports 14 and sealing tape 15.

Next, an operation of the gas generator for an air bag shown in FIG. 1 when applied to an air bag system of an automobile will be described. Depending on the extent of an impact received by the automobile during a collision, the first igniter 23 and second igniter 27 may be activated in any the following three patterns; only the first igniter 23 is activated; the first igniter 23 is activated first and the second igniter 27 is activated with a delay; the first igniter 23 and second igniter 27 are activated simultaneously. In the following, a case in which the first igniter 23 is activated first and the second igniter 27 is activated with a delay will be described.

When the automobile receives an impact upon a collision, an activation signal is received from a control unit, whereby the first igniter 23 is activated and ignited. As a result, the first gas generating agent is burned such that high-temperature combustion gas is generated. The combustion gas is filtered and cooled as it passes through the coolant/filter 45, whereupon the combustion gas ruptures the sealing tape 15 and is discharged through the gas discharge ports 14 to inflate the air bag. At this time, the second combustion chamber 35 is surrounded by the cup member 41 and the through-holes 42 are closed, and therefore the combustion gas generated in the first combustion chamber 31 does not flow into the second combustion chamber 35.

The second igniter 27 is activated and ignited at a slightly delayed timing, whereby the second gas generating agent is burned and high-temperature combustion gas is generated. The cup member 41 forming the second combustion chamber 35 is raised by the pressure from the high-temperature combustion gas, and as a result, the ceiling surface 43 thereof passes through the hole 33 and impinges on the diffuser shell ceiling surface 12a.

At this time, the through-holes 42 also rise, thereby shifting from a state of contact with the larger diameter portion 26a to a state of direct opposition to the smaller diameter portion 26b. As a result, a gap corresponding to the difference in diameter between the larger diameter portion 26a and smaller diameter portion 26b is formed between the through-holes 42 and the peripheral surface of the smaller diameter portion 26b, and the through-holes 42 shift from a closed state to an open state such that a gas discharge passage can be secured.

Note that by adjusting the height of the cup member 41 and the gap between the ceiling surface 43 of the cup member 41 and the ceiling surface 12a of the diffuser shell 12, a gas discharge passage can be secured without providing the through holes 42 by raising the cup member 41 such that the opening portion peripheral edge thereof directly opposes the smaller diameter portion 26b of the second igniter collar 26.

The combustion gas in the second combustion chamber 35 then flows out through the through-holes 42, passes through the coolant/filter 45 where it is filtered and cooled, and is then discharged through the gas discharge ports 14 to further inflate the air bag.

The invention thus described, it will be obvious that the same may be varied in many ways. Such variations are not to be regarded as a departure from the spirit and scope of the invention, and all such modification as would be obvious to one skilled in the art are intended to be included within the scope of the following claims.

The invention claimed is:

1. A gas generator for an air bag, comprising:
   a housing having a gas discharge port,
   a first combustion chamber provided with a first gas generating agent and a first iginition device inside the housing; and
   a second combustion chamber provided with a second gas generating agent and a second ignition device inside the housing,
   the second combustion chamber being separated from the first combustion chamber by a cup member disposed within the housing,
   the second gas generating agent and the second ignition device being disposed within the cup member, and
   the cup member being moved upon activation of the second ignition device, thereby forming a discharge passage for discharging a gas generated in the second combustion chamber,
   wherein the cup member has a closed through-hole in a lower end portion thereof,
   when the cup member is moved upon the activation of the second ignition device, the through-hole opens, thereby forming the discharge passage for discharging the gas generated in the second combustion chamber, and
   the second ignition device comprises a combination of a second igniter and a second igniter collar, and, by fitting an opening portion of the cup member onto the second igniter collar, the cup member is fixed into position such that the through-hole in the cup member is closed by the second igniter collar.

2. The gas generator for an air bag according to claim 1, wherein a peripheral edge of an opening portion of the cup member is in contact with a bottom face of the housing and a gap exists between a ceiling surface of the cup member and a ceiling surface of the housing, and when the second ignition device is activated, the cup member rises such that the ceiling surface of the cup member impinges on the ceiling surface of the housing, thereby forming the discharge passage for discharging the gas generated in the second combustion chamber.

3. The gas generator for an air bag according to claim 1, wherein the second combustion chamber is located within the first combustion chamber, a first ignition device, including a first igniter and a first igniter collar, is disposed within the first combustion chamber, and a part of a peripheral surface of the cup member is sandwiched between the first igniter collar and the second igniter collar.

4. A gas generator for an air bag, comprising:
   a housing having a gas discharge port,
   a first combustion chamber disposed inside the housing and provided with a first gas generating agent and a first ignition device;
   a second combustion chamber disposed inside the housing and provided with a second gas generating agent and a second ignition device;
   a cup member disposed in the housing, the cup member separating the second combustion chamber from the first combustion chamber, the second gas generating agent and the second ignition device being disposed within the cup member, the cup member having a through-hole in a lower end portion thereof and being moved upon activation of the second ignition device,
   wherein, the second ignition device comprises a combination of an igniter and an igniter collar, and, by press-fitting an opening portion of the cup member onto the igniter collar, the cup member is fixed into position such that the through-hole in the cup member is closed, and
   when the cup member is moved upon activation of the second ignition device, the through-hole opens, thereby exposing the through-hole for discharging the gas generated in the second combustion chamber.

* * * * *